US012689659B2

(12) United States Patent (10) Patent No.: US 12,689,659 B2
Ács et al. (45) Date of Patent: Jul. 21, 2026

(54) ZERO TRUST POLICY MANAGER

(71) Applicant: Cisco Technology, Inc., San Jose, CA (US)

(72) Inventors: György Ács, Paty (HU); Patrick Cardot, Montlignon (FR); Pascal Delprat, Collobrières (FR); Hatem Aljehani, Jeddah (SA)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 18/532,497

(22) Filed: Dec. 7, 2023

(65) Prior Publication Data

US 2025/0193243 A1 Jun. 12, 2025

(51) Int. Cl.
H04L 9/40 (2022.01)
(52) U.S. Cl.
CPC .................................... H04L 63/20 (2013.01)
(58) Field of Classification Search
CPC ........................................................ H04L 63/20
USPC .......................................................... 726/26
See application file for complete search history.

(56) References Cited

U.S. PATENT DOCUMENTS

2017/0195349 A1 7/2017 Shabtai et al.
2018/0262348 A1* 9/2018 Golshan ................ H04L 9/0838

2019/0342335 A1 11/2019 Ni
2020/0169476 A1* 5/2020 Vela ....................... H04L 41/142
2021/0203687 A1 7/2021 Rabin et al.
2022/0070223 A1* 3/2022 Deng ....................... H04L 63/20
2022/0091994 A1 3/2022 Jain et al.
2024/0031411 A1* 1/2024 Levari ................. H04L 63/1416
2024/0073248 A1* 2/2024 Barton ..................... H04L 63/20
2024/0184905 A1* 6/2024 Chouhan .............. G06F 21/629

FOREIGN PATENT DOCUMENTS

EP 3166281 7/2019

OTHER PUBLICATIONS

Kotenko et al., "Visualization of Security Metrics for Cyber Situation Awareness," IEEE Xplore, Dec. 11, 2014, pp. 1-8.

* cited by examiner

*Primary Examiner* — Anthony D Brown
(74) *Attorney, Agent, or Firm* — Polsinelli P.C.

(57) ABSTRACT

In some aspects, a method for managing security policies on a network may include a policy manager receiving, from one or more security services implemented on a network, information descriptive of a security policy data and a security status of at least one network connection between a user and a service protected by the one or more security services. The policy manager may also compare the security policy data and the security status of at least one network connection to determine one or more discrepancies between an intent of the security policy data and the security status. Finally, the policy manager may present a visual representation of the security data that includes at least an indication of the one or more discrepancies.

20 Claims, 5 Drawing Sheets

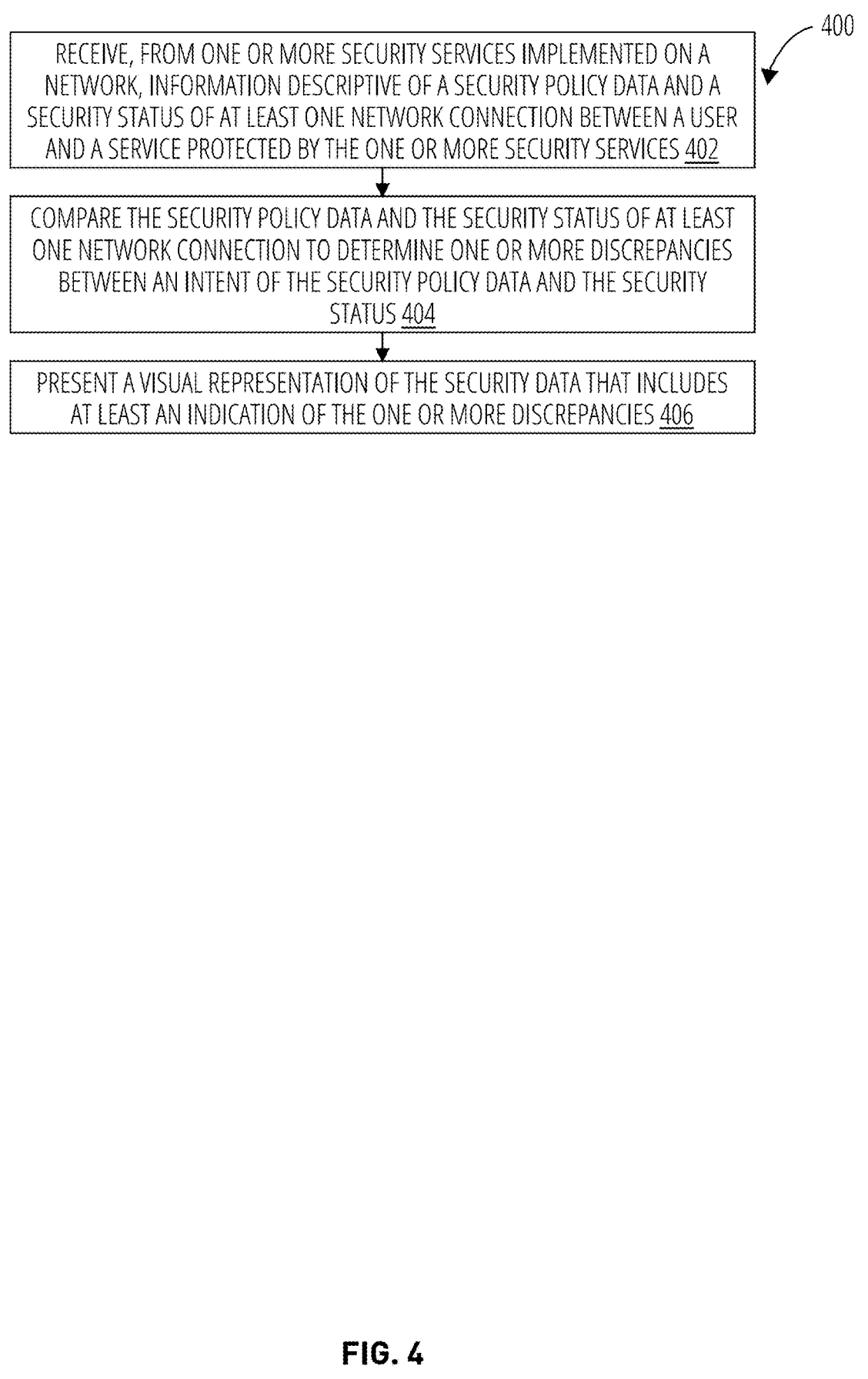

400

RECEIVE, FROM ONE OR MORE SECURITY SERVICES IMPLEMENTED ON A NETWORK, INFORMATION DESCRIPTIVE OF A SECURITY POLICY DATA AND A SECURITY STATUS OF AT LEAST ONE NETWORK CONNECTION BETWEEN A USER AND A SERVICE PROTECTED BY THE ONE OR MORE SECURITY SERVICES 402

COMPARE THE SECURITY POLICY DATA AND THE SECURITY STATUS OF AT LEAST ONE NETWORK CONNECTION TO DETERMINE ONE OR MORE DISCREPANCIES BETWEEN AN INTENT OF THE SECURITY POLICY DATA AND THE SECURITY STATUS 404

PRESENT A VISUAL REPRESENTATION OF THE SECURITY DATA THAT INCLUDES AT LEAST AN INDICATION OF THE ONE OR MORE DISCREPANCIES 406

FIG. 4

ZERO TRUST POLICY MANAGER

TECHNICAL FIELD

The present technology pertains to security policies, and, more specifically, to parsing and storing data from one or more security mechanism and generating a wholistic platform for security policy management.

BACKGROUND

In a large network, a network administrator and/or a security administrator may implement one or more security protocols and policies throughout the network. These security protocols and policies may be broadly implemented throughout the network or may be implemented to certain aspects of the network, such as a specific group of users, devices, buildings, or any other differentiator applicable to the network. The security protocols and policies may also require more than one security service to successfully implement the security protocols and policies to the network. The different security services are managed individually (or in small clusters) through individual application programming interfaces (APIs), which can make managing and configuring the different security services tedious.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 4 illustrates an example flowchart for managing security policies on a network according to aspects of the present disclosure.

DETAILED DESCRIPTION

Figure 1:
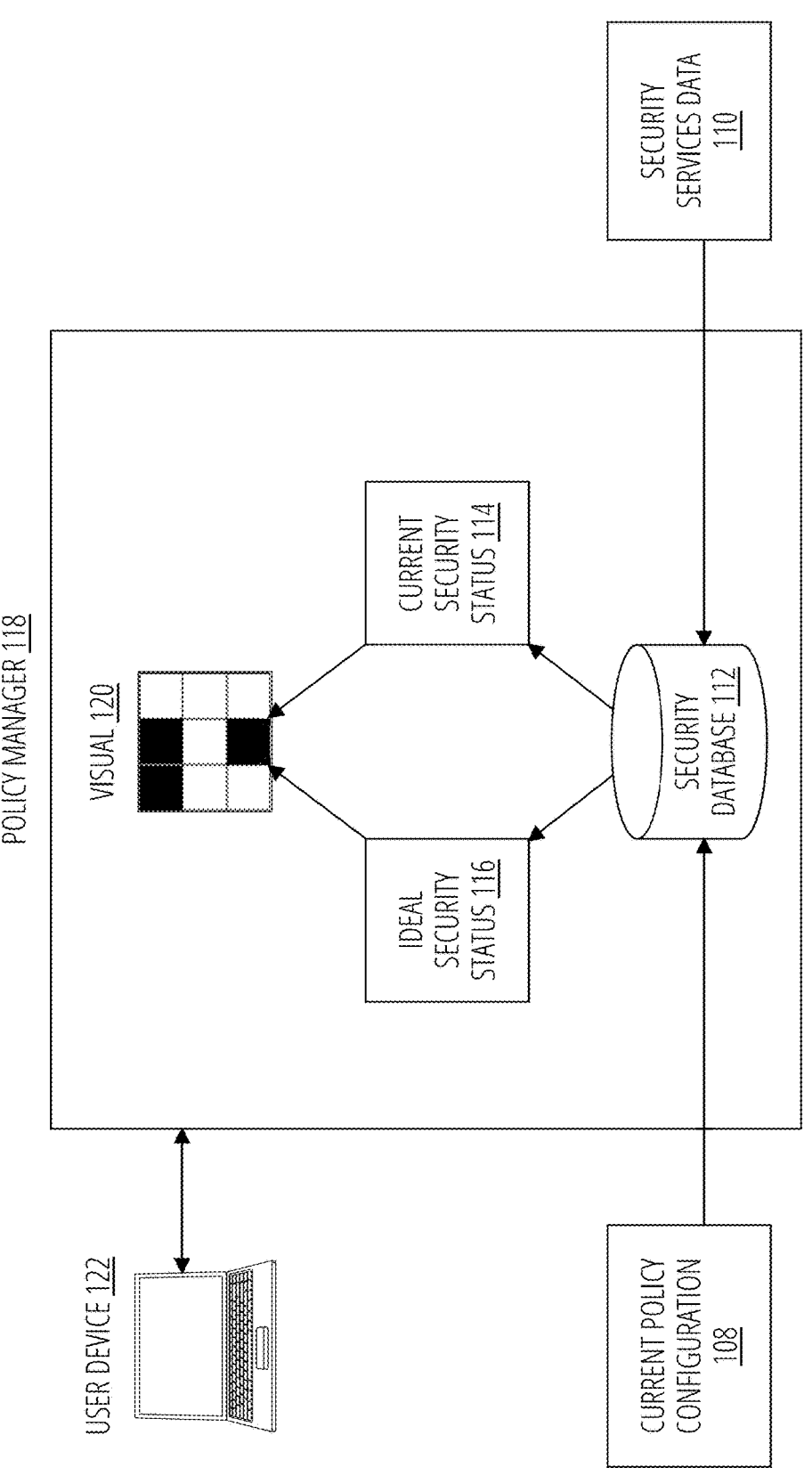
FIG. 1 illustrates an example system for managing security policies on a network according to aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Overview

In some aspects, a computer-implemented method for managing security policies on a network may include a policy manager receiving, from one or more security services implemented on a network, information descriptive of a security policy data and a security status of at least one network connection between a user and a service protected by the one or more security services. The policy manager may also compare the security policy data and the security status of at least one network connection to determine one or more discrepancies between an intent of the security policy data and the security status. Finally, the policy manager may present a visual representation of the security data that includes at least an indication of the one or more discrepancies.

In another aspect, the method may also include receiving a request to update the security policy data, where the request includes a modification to the security policy data associated with the one or more security services, and transmitting the request to a policy modification program, where when received by the policy modification program, the policy modification program distributes the modification to the security policy data to at least one of the one or more security services.

In another aspect, the method may also include generating a database comprised of at least the one or more security services and the security data.

In another aspect, the visual representation is configured as a matrix, indicating at least a device and one or more network connections associated with the device.

In another aspect, the visual representation is configured to display security data according to workforce (e.g., user, group, client app, device, etc.), workplace (e.g., edge device, network core, Internet, URL, etc.) or workload (e.g., service, database, application, etc.).

In another aspect, the method may also include updating the visual representation according to periodic updates to the security data as indicated by a security policy associated with the network. Other technical features may be readily apparent to one skilled in the art from the following figures, descriptions, and claims.

In another aspect, the at least one of the one or more security services implements the modification to the security policy data on the network.

In another aspect, the database has a hierarchical tree structure comprised of objects and arrays, and where the hierarchical tree structure includes at least a user, user group, a device, and a network access method based on the security data. [JSON database] Other technical features may be readily apparent to one skilled in the art from the following figures, descriptions, and claims.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a policy manager and database that integrates data from one or more security services into a holistic API. Large networks often are comprised of several security services and/or protocols that are implemented throughout the network. The security services may be implemented on specific aspects of the network or may be broadly applied throughout the network. These security services are currently managed individually (or in small clusters) through individual APIs, which makes configuring the security services tedious. Collecting security policies for analysis and/or examination is also cumbersome, where a network administrator must collect the policies individually for each security policy. Additionally, there is no method of viewing a summary of the security services and their implementations on the network.

To resolve the issue of security policy and product management, a policy manager that allows a network administrator and/or security administrator to view, modify, and assess the network's current security framework. The policy manager gathers data from security services throughout the network (e.g., policy data, statistical data, connectivity data, status data, etc.), inputs the data into a central key database structure, then generates one or more visual representations and/or summaries of the data over the entire network so that a network administrator can obtain a wholistic view of the security status of the network. The policy manager may gather data by analyzing an API associated with a particular security service. The policy manager may compare actual security and/or connectivity status of one or more users, programs, etc. to an ideal/intended security and/or connectivity status and present visual representations of disparities to the network administrator. In some embodiments, the network administrator may configure the visual representations according to workforce (e.g., user, group, client app, device, etc.), workplace (e.g., edge device, network core, Internet, URL, etc.) or workload (e.g., service, database, application, etc.). The visual representation may identify potential security breaches or weak points in the network.

After examining the visual representation of the security status of the network, the network administrator may make changes to the policies of one or more security policies through the policy manager. The network administrator may define or modify a policy for execution throughout the security services (e.g., restricting access to a particular website, limiting durations of remote desktop certificates, etc.) and transmit the modified policy to a policy modification program, which is connected to the security services and facilitates generating a new policy for a security service that aligns with the modified policy. For example, the policy modification program may receive a new policy addition from the policy manager and may circulate the new policy addition to appropriate security services in a manner understandable by each security service (e.g., the instructions transmitted to each security service may differ, but are fundamentally enforcing the new policy addition received from the policy manager).

FIG. 1 illustrates an example system for managing security policies on a network according to aspects of the present disclosure. The network may be a computer network deployed over a vast amount of users, devices, and locations, and may be a local area network (LAN), wireless local area network (WLAN), wide area network (WAN), metropolitan area network (MAN), or any other type of computer network that provides network connectivity to at least two users and/or user devices.

On a computer network, such as the network discussed herein, one or more security services may be necessary to protect the network from viruses, malware, and other types of attacks from inside or outside parties. In some examples, the network may include other security services intended to increase the productivity of users, limit obscene content, or reduce access to potentially harmful data. The one or more security services may include firewalls, forward/reverse proxies, filters, VPNs, or any other type of software implementation employed on the network. In addition to the variety of security services applied on the network, these security services may also be managed by a variety of different providers. Thus, the security services may be managed through different APIs. For example, a firewall may be managed on a different API than a content filter.

The different APIs make it cumbersome and tedious for a network administrator to manage, observe, and make changes to one or more security policies associated with the network that are implemented by the one or more security services. Policy manager 118 incorporates one or more APIs associated with the one or more security services to produce a holistic view of a security landscape of the network. Policy manager 118 may be an application running on a server or a software-as-a-service (SaaS) based service which will rely on API services of security and networking devices. Network administrators may configure policy manager 118 from user device 122. Policy manager 118 may include capabilities to view potential security threats within the network, view the connectivity of one or more user devices connected to the network, modify security policies associated with the network, and/or other mechanisms pertaining to the security on the network.

Policy manager 118 may include security database 112. Security database 112 may be a JavaScript Object Notation (JSON) database that may store data in a hierarchical tree structure comprised of objects and arrays. The hierarchical tree structure may include data from current policy configuration 108 and security services data 110, which may include a user, user group, a device, and a network access method (e.g., DUO MFA, ISE-802.1X, and/or free access) based on the security data. In some examples, the tree structure may also include data pertaining to the device, including, but not limited to, an infection status, a network location, a geolocation, a time range, a client application, a role, and/or a group. In some examples, the tree structure may include additional data pertaining to a service (e.g., a cloud-based service accessible by the device), such as an IP network destination, a role, a group, a URL, and/or data related to an IPS intrusion rule check. In addition to the service, the tree structure may also include data pertaining to an application associated with the device, which may include data about a vulnerability of the application. For example, the structure of security database 112 may include context for IPS rules, MFA options, locations, connection time, any combination thereof, or the like.

Current policy configuration 108 may include one or more security policies implemented by the network administrator on the network. The security policies may be enforced by one or more services, including firewalls, filters, forward/ reverse proxies, any combination thereof, or the like. Current policy configuration 108 may receive one or more security policies from one or more locations, including the APIs associated with one or more security services, the network administrator, and/or enterprise policies. The one or more security policies may be compiled and transmitted to security database 112. Security database 112 may parse the one or more security policies from current policy configuration 108 and input appropriate data into a stored database.

Security services data 110 may include real-time data from one or more security services pertaining to the actual network security framework. For example, security services data 110 may include data regarding a device's current connectivity status to one or more services, potential security threats detected at a cloud provider, an encryption key vulnerability at one or more servers, any combination thereof, or the like. As opposed to current policy configuration 108, which may be associated with the hypothetical security status of the network, security services data 110 may be associated with the actual security status of the network. Security services data 110 may receive the data from one or more security services from the one or more security services directly (e.g., requesting the data from the one or more security services), or security services data 110 may gather the data from APIs associated with the one or more security services. The data from one or more security services may be compiled and transmitted to security database 112, which may parse the data and input appropriate data into the stored database.

Policy manager 118 may generate ideal security status 116 and current security status 114 using data from security database 112. Ideal security status 116 may include data pertaining to a network security framework if there are no data breaches, viruses, malware, attacks, or any other potential hazards to the network. Ideal security status 116 may serve as a "baseline" within policy manager 118 that may indicate what the network security framework should be according to a security policy configuration set by the network administrator. Current security status 114 may indicate what the actual network security framework is of the network at the current time. Current security status 114 may include data pertaining to security breaches, malware, viruses, attacked, or any other hazard detected within the network by the one or more security services that could pose a threat to the network.

Policy manager 118 may compare ideal security status 116 and current security status 114 and use the comparison to generate visual 120. Visual 120 may be a representation of the current security status 114 in reference to ideal security status 116. Visual 120 may be a matrix, a graph, an image, a number (e.g., indicating an overall threat level on a variable scale from 1 to 10), a list, a map, a tree, and/or any other variety of visual that may be used to represent a holistic view of the network security framework. Visual 120 may display the entire network, a particular group, user, building, department, time frame, device type, connection type (e.g., devices on the network connected to a remote cloud server, external devices connected to the network through remote desktop protocol, etc.), any combination thereof, or the like.

In some examples, visual 120 may be interactive, such that the network administrator can make selections using a communication interface on user device 122. For example, the network administrator, via user device 122, may "click" or select a portion of visual 120 to view additional details, make an adjustment, and/or export data from visual 120. In some examples, visual 120 may include more than one visual representation of the network security framework and the network administrator, via user device 122, may select one or more of the visuals of visual 120 to view on the communication interface.

Figure 2:
FIG. 2 illustrates an example visual representation of a security status of the network according to aspects of the present disclosure.

FIG. 2 illustrates an example visual representation of a security status of the network according to aspects of the present disclosure. For example, visual 206 FIG. 2 may be an example of visual 120 generated by policy manager 118 as described in FIG. 1. Visual 206 may represent the current network security framework using a matrix format, such that devices 202 are represented by the rows and connections 204 are represented by the columns. For example, each device within devices 202 is represented in a row of visual 206, and associated connections to one or more other devices, servers, cloud providers, networks, any combination thereof, or the like, are represented by icons in an associated column of connections 204.

Devices 202 may be one or more devices connected to the network, including desktop computers, laptops, mobile phones, servers, private clouds, any combination thereof, or the like. In some examples, devices 202 may include devices such as printers, security cameras, fax machines, or other types of IoT devices. A network administrator may apply one or more filters to devices 202 to limit the amount of devices shown in visual 206. For example, the network administrator may apply a filter to view devices connected within a particular building, associated with a particular department, associated with a particular user, types of devices, etc. Devices 202 may show the type of device associated with the row and/or a user associated with the row.

Connections 204 may show one or more servers, services, cloud providers, devices, networks, any combination thereof, or the like, connected to by any of the devices shown in devices 202. For example, a device may be connected to a cloud provider and accessing an internal database, therefore the cloud provider and internal database may be shown within connections 204 in visual 206. Connections 204 may, in addition to displaying a type of connection (e.g., cloud provider, database, server, etc.), may also display a security status of a column associated with the type of connection. For example, a virus detected within a particular connection may be illustrated by a "bug" or a change in color.

In visual 206, the intersection between a device of devices 202 (i.e., a row) and a connection of connections 204 (i.e., a column) may indicate a connection status. For example, a "checkmark" may indicate an authorized connection, an "x" may indicate an unauthorized connection, a symbol of a triangle with an exclamation point may indicate a potentially unsafe connection, and a magnifying glass may indicate further inspection is required regarding the connection (e.g., other policy context elements are required, like IPS and MFA services, time, working hours, location, etc.).

The network administrator may interact with visual 206 using a user device (e.g., user device 122 as described in FIG. 1) and may select a portion of visual 206 to view additional details, make changes to an appropriate security policy, export the data displayed in visual 206, contact one or more users of the devices 202, any combination thereof, or the like.

Figure 3:
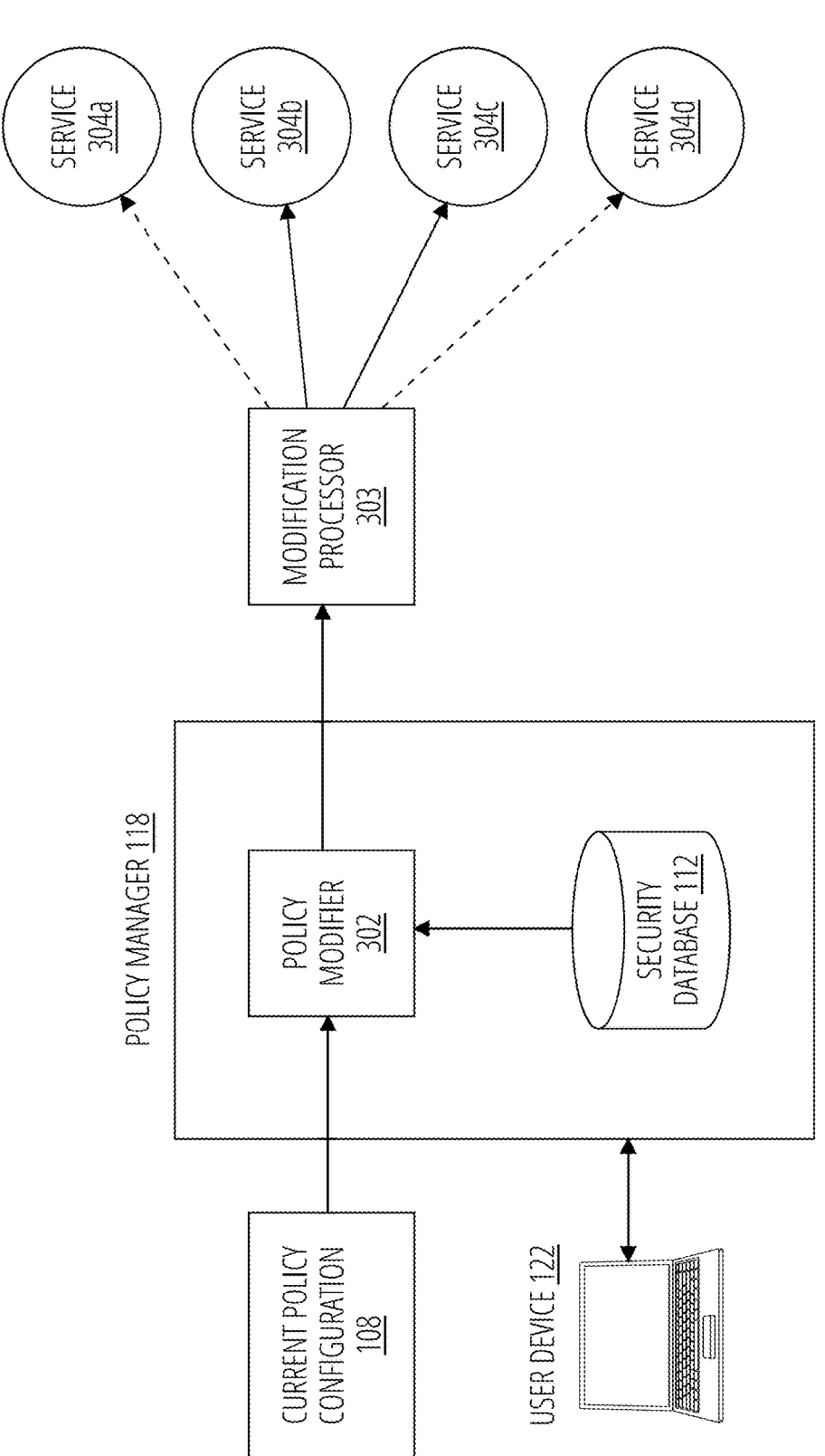
FIG. 3 illustrates an example system for implementing modifications to one or more security policies of the network according to aspects of the present disclosure.

FIG. 3 illustrates an example system for implementing modifications to one or more security policies of the network according to aspects of the present disclosure. This may include components described in FIG. 1, including policy manager 118, user device 122, current policy configuration 108, and security database 112.

A network administrator may access policy manager 118 using a communication interface of user device 122 and may use policy manager 118 to modify existing security policies associated with one or more security services. For example, after examining a visual of a network security framework (e.g., visual 120 as described in FIG. 1), the network administrator may identify potential modifications to an existing security policy that may improve the network security framework (e.g., reduce the amount of network exposure to viruses, limit access to a service prone to data leaks, etc.). Policy manager 118 may access policy modifier 302, which may be an API within policy manager 118 that allows a network administrator to make changes to existing network security policies.

Policy modifier 302 may receive input from current policy configuration 108 and security database 112 and use this input to generate a summary of the security policies that are currently being implemented on the network and where potential security threats may exist on the network. The summary may include a list of connected devices, a list of connections from connected devices, one or more security services used on the network, a list of recent changes on the network (e.g., new enterprise policies, new devices, updated topography information, personnel changes, etc.), recommended security policy updates, a list of frequently infiltrated (e.g., impacted by data breaches, viruses, malware, etc.) devices and/or connections, any combination thereof, or the like. In some examples, the summary may be visual (e.g., a graph, a matrix, a table, an image, a diagram, etc.), written (e.g., a list, a paragraph, a table with writing, etc.), or a combination of the two. In some examples, policy modifier 302 may be incorporated into visual 120 described in FIG. 1. For example, the network administrator may interact with visual 120 via the communication interface of user device 122 and access policy modifier 302 via visual 120.

Using the summary generated by policy modifier 302, the network administrator may input one or more changes to the current security policies implemented on the network into policy modifier 302. Policy modifier 302 may present one or more methods of modifying the current security policies, including drop-down menus, checkboxes, text input, any combination thereof, or the like. For example, via policy modifier 302, the network administrator may limit the access of a device to a particular cloud service, server, and/or database by un-checking a box within policy modifier 302.

Policy modifier 302 may receive input from the user device 122 indicating changes to the current security policies implemented on the network and may output the changes to modification processor 303. Modification processor 303 may receive the changes and may determine one or more security services that should be modified such that the changes are implemented accordingly. For example, policy modifier 302 may indicate that a certain website should be blocked on the network and modification processor 303 determines one or more security services (e.g., a firewall implemented on the network) that should be instructed accordingly in order to block the certain website. In some examples, the changes may be implemented using a combination of one or more security services. For example, restricting access to a cloud provider may require the services of one or more security services to enforce the restriction over the entire network (e.g., one provider for an office in San Francisco and one provider for an office in Los Angeles).

Modification processor 303 may convert the changes indicated by policy modifier 302 into a format suitable for the one or more security services selected by modification processor 303 to enforce the changes. Modification processor 303 may generate instructions for the one or more security services according to the converted changes and transmit the instructions to security service 304a, security service 304b, security service 304c, and/or security service 304d. For example, modification processor 303 may determine that service 304*b* and service 304*c* are necessary to enforce the changes to the security policy and may generate and transmit instructions to service 304*b* and service 304*c* to implement the changes. The instructions transmitted to the one or more security services may differ for each security service. For example, the instructions transmitted to service 304*b* may differ from the instructions transmitted to service 304*c*. The transmitted instructions may be specific to a particular security service.

FIG. 4 illustrates an example flowchart for managing security policies on a network according to aspects of the present disclosure. In block 402, routine 400 receives, from one or more security services implemented on a network, information descriptive of a security policy data and a security status of at least one network connection between a user and a service protected by the one or more security services. For example, a policy manager (e.g., policy manager 118 as described in FIG. 1) may receive information descriptive of the security policy data (e.g., current policy configuration 108 as described in FIG. 1) and the security status of at least one connection between a user and a service protected by the one or more security services (e.g., security services data 110 as described in FIG. 1) and may store that information in a database (e.g., security database 112). The database may parse the information and store it in a hierarchical tree structure.

The security policy data may include data regarding one or more security policies implemented on the network by a network administrator, a security administrator, a controller, an enterprise policy, any combination thereof, or the like. The security policy data may also include data regarding the ideal security status of the network. For example, the ideal security status may be the connectivity of one or more devices on the network if there is no malware, viruses, data breaches, or other issue present on the network.

The security status of at least one network connection may be gathered from one or more security products actively implemented on the network. The one or more security products may be different in their application (e.g., a firewall, a reverse proxy, a filter, etc.), but may be applied to network connections between a user and a service. The security status may include issues on the network in real-time, such as current data breaches, viruses, malware, attempted hacking, or other issues that are currently present on the network.

In block 404, routine 400 compares the security policy data and the security status of at least one network connection to determine one or more discrepancies between an intent of the security policy data and the security status. For example, the policy manager (policy manager 118) may compare the security policy data (e.g., current policy configuration 108) and the security status of at least one network connection (e.g., security services data 110) to determine one or more discrepancies between the intent of the security policy data and the security status. In some examples, the policy manager may query the database storing the security policy data and the security status for relevant data and may compare data received from the database.

The policy manager, using the security policy data and the security status, may determine where there are potential security threats within a network security framework. The policy manager may examine the security policy data and determine where within the network the security status does not align with the security policy data. The policy manager may identify these differences as a potential security threat to the network.

In block 406, routine 400 presents a visual representation of the security data that includes at least an indication of the one or more discrepancies. For example, the policy manager (e.g., policy manager 118) may present the visual representation (e.g., visual 120 as described in FIG. 1) of the security data that includes at least an indication of the one or more discrepancies. The visual representation may be a graph, a table, a matrix, an image, a diagram, any combination thereof, or the like. The visual representation may also be text and/or a combination of text and visuals. The visual representation may indicate to a network administrator potential security threats within the network. The potential security threats may be unsecured connections between a device and a service, a detected virus, a data breach at a cloud provider, a suspicious link accessed via a browser of a device, any combination thereof, or the like.

Figure 5:
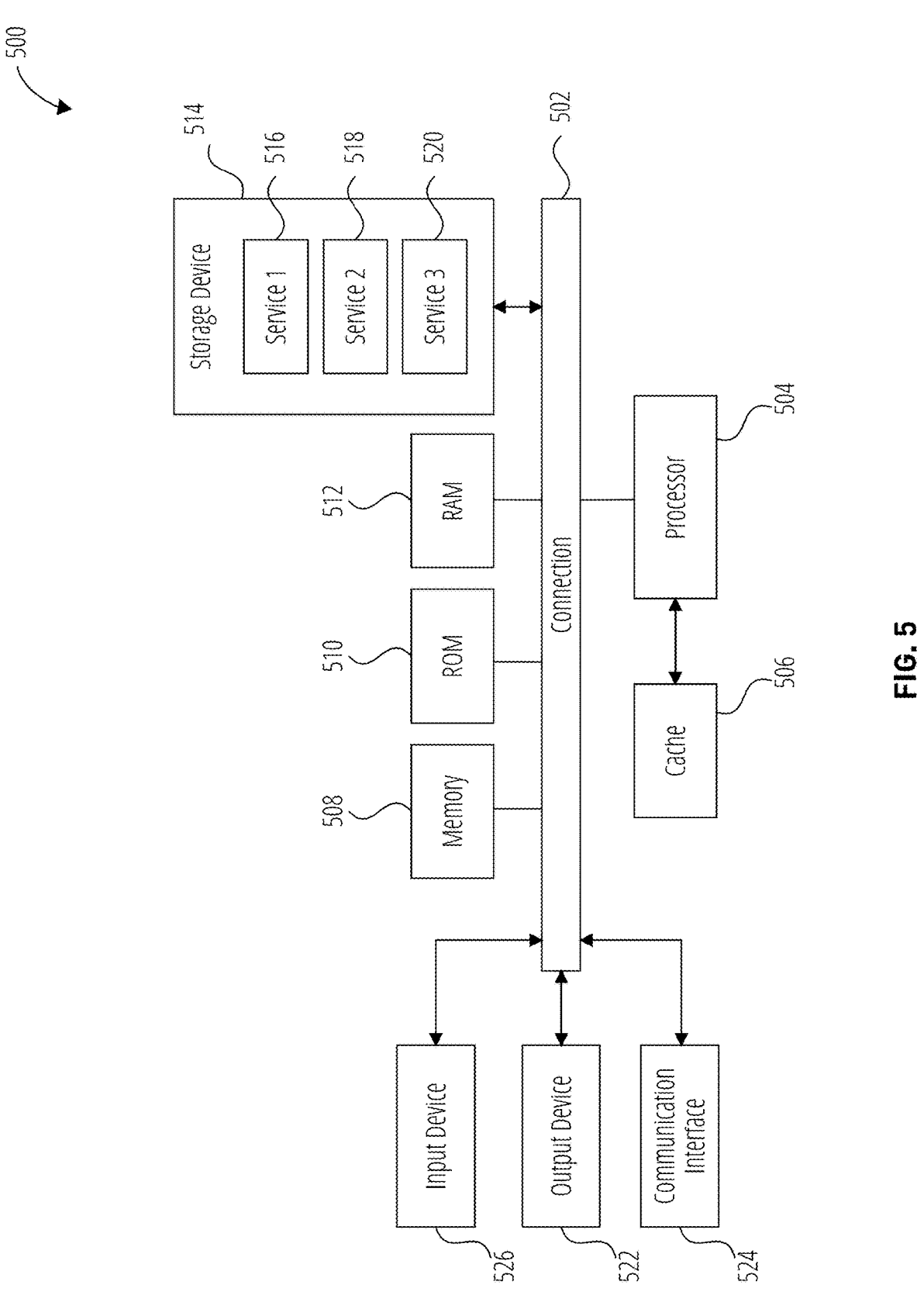
FIG. 5 shows an example of a computer system for implementing aspects of the present disclosure.

FIG. 5 shows an example of a computer system for implementing aspects of the present disclosure, which can be for example any computing device making up the systems described in FIGS. 1 and 3, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method for managing security policies on a network, comprising:

receiving, from one or more security services implemented on a network, information descriptive of a security policy data and a security status of at least one network connection between a user and a service protected by the one or more security services;

comparing the information descriptive of the security policy data and the security status of at least one network connection to determine one or more discrepancies between an intent of the security policy data and the security status by identifying portions of the information descriptive of the security policy data that are not reflected in the security status of at least one network connection; and presenting an interactive visual representation, the interactive visual representation includes the security data that includes at least an indication of the one or more discrepancies, an overall threat level, and at least a portion of the network.

2. The computer-implemented method of claim 1, further comprising:

receiving a request to update the security policy data, wherein the request includes a modification to the security policy data associated with the one or more security services; and transmitting the request to a policy modification program, wherein when received by the policy modification program, the policy modification program distributes the modification to the security policy data to at least one of the one or more security services.

3. The computer-implemented method of claim 2, wherein the at least one of the one or more security services implements the modification to the security policy data on the network.

4. The computer-implemented method of claim 1, further comprising: generating a database comprised of at least the one or more security services and the security data.

5. The computer-implemented method of claim 4, wherein the database has a hierarchical tree structure comprised of objects and arrays, and wherein the hierarchical tree structure includes at least a user, user group, a device, and a network access method based on the security data.

6. The computer-implemented method of claim 1, wherein the visual representation is configured as a matrix, indicating at least a device and one or more network connections associated with the device.

7. The computer-implemented method of claim 1, wherein the visual representation is configured to display security data according to workforce, workplace, or workload.

8. The computer-implemented method of claim 1, further comprising:

updating the visual representation according to periodic updates to the security data as indicated by a security policy associated with the network.

9. A system comprising:

one or more processors; and

a memory storing instructions that, when executed by the one or more processors, configure the system to:

receive, from one or more security services implemented on a network, information descriptive of a security policy data and a security status of at least one network connection between a user and a service protected by the one or more security services;

compare the information descriptive of the security policy data and the security status of at least one network connection to determine one or more discrepancies between an intent of the security policy data and the security status by identifying portions of the information descriptive of the security policy data that are not reflected in the security status of at least one network connection; and present an interactive visual representation, the interactive visual representation includes the security data that includes at least an indication of the one or more discrepancies, an overall threat level, and at least a portion of the network.

10. The system of claim 9, wherein the instructions further configure the system to:

receive a request to update the security policy data, wherein the request includes a modification to the security policy data associated with the one or more security services; and transmit the request to a policy modification program, wherein when received by the policy modification program, the policy modification program distributes the modification to the security policy data to at least one of the one or more security services.

11. The system of claim 10, wherein the at least one of the one or more security services implements the modification to the security policy data on the network.

12. The system of claim 9, wherein the instructions further configure the system to:

generate a database comprised of at least the one or more security services and the security data.

13. The system of claim 12, wherein the database has a hierarchical tree structure comprised of objects and arrays, and wherein the hierarchical tree structure includes at least a user, user group, a device, and a network access method based on the security data.

14. The system of claim 9, wherein the visual representation is configured as a matrix, indicate at least a device and one or more network connections associated with the device.

15. The system of claim 9, wherein the visual representation is configured to display security data according to workforce, workplace, or workload.

16. The system of claim 9, wherein the instructions further configure the system to:

update the visual representation according to periodic updates to the security data as indicated by a security policy associated with the network.

17. A non-transitory computer-readable storage medium, the non-transitory computer-readable storage medium including instructions that when executed by a computer, cause the computer to:

receive, from one or more security services implemented on a network, information descriptive of a security policy data and a security status of at least one network connection between a user and a service protected by the one or more security services;

compare the information descriptive of the security policy data and the security status of at least one network connection to determine one or more discrepancies between an intent of the security policy data and the security status by identifying portions of the information descriptive of the security policy data that are not reflected in the security status of at least one network connection; and present an interactive visual representation, the interactive visual representation includes a the security data that includes at least an indication of the one or more discrepancies, an overall threat level, and at least a portion of the network.

18. The non-transitory computer-readable storage medium of claim 17, wherein the instructions further configure the computer to:

receive a request to update the security policy data, wherein the request includes a modification to the security policy data associated with the one or more security services; and transmit the request to a policy modification program, wherein when received by the policy modification program, the policy modification program distributes the modification to the security policy data to at least one of the one or more security services.

19. The non-transitory computer-readable storage medium of claim 17, wherein the instructions further configure the computer to:

generate a database comprised of at least the one or more security services and the security data.

20. The non-transitory computer-readable storage medium of claim 19, wherein the database has a hierarchical tree structure comprised of objects and arrays, and wherein the hierarchical tree structure includes at least a user, user group, a device, and a network access method based on the security data.

* * * * *